(No Model.) 2 Sheets—Sheet 1.
J. G. SCHILLER.
CAR BRAKE.
No. 255,539. Patented Mar. 28, 1882.
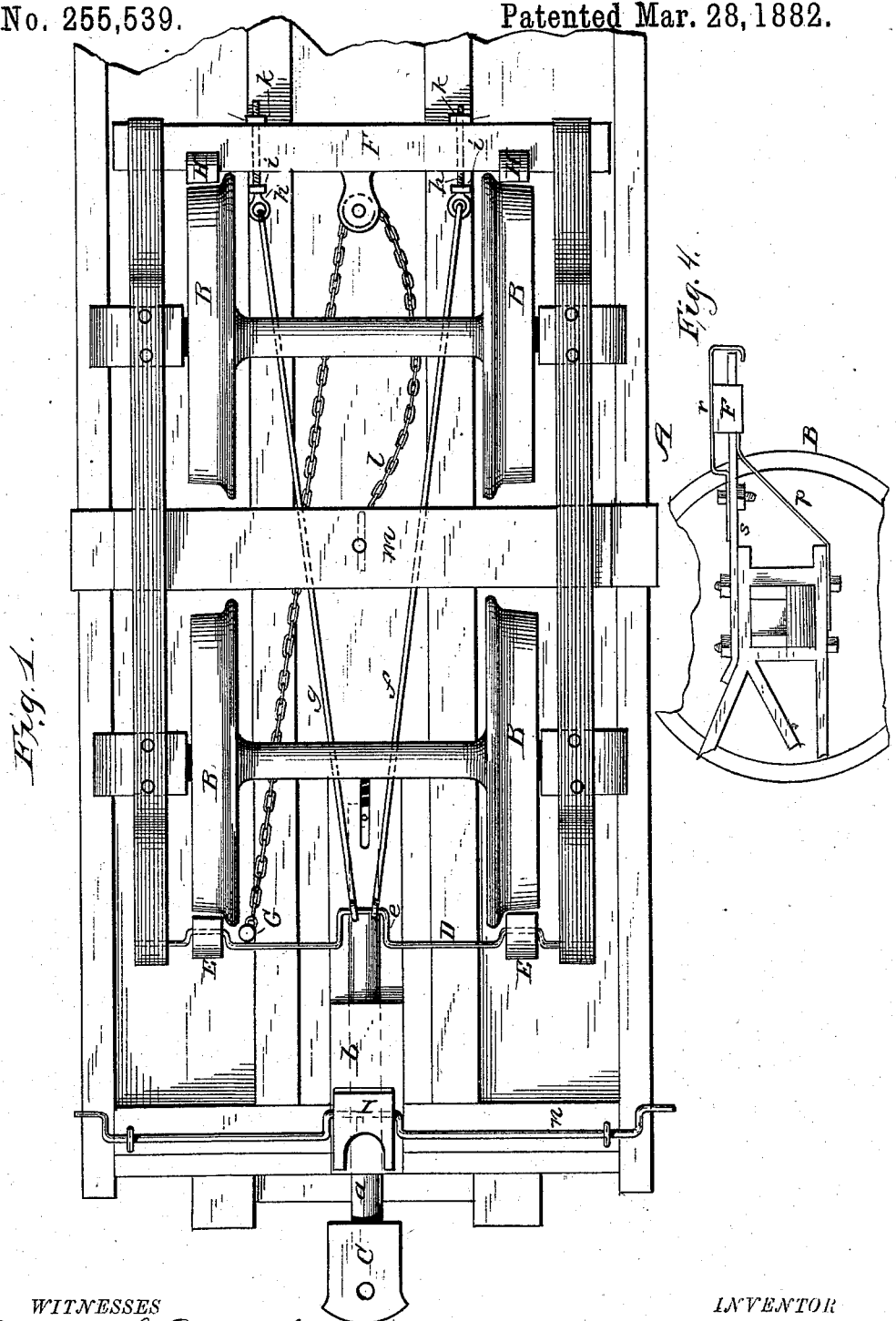
WITNESSES
Franck L. Ourand
L. L. Miller
INVENTOR
John G. Schiller
Attorney Chas. H. Fowler

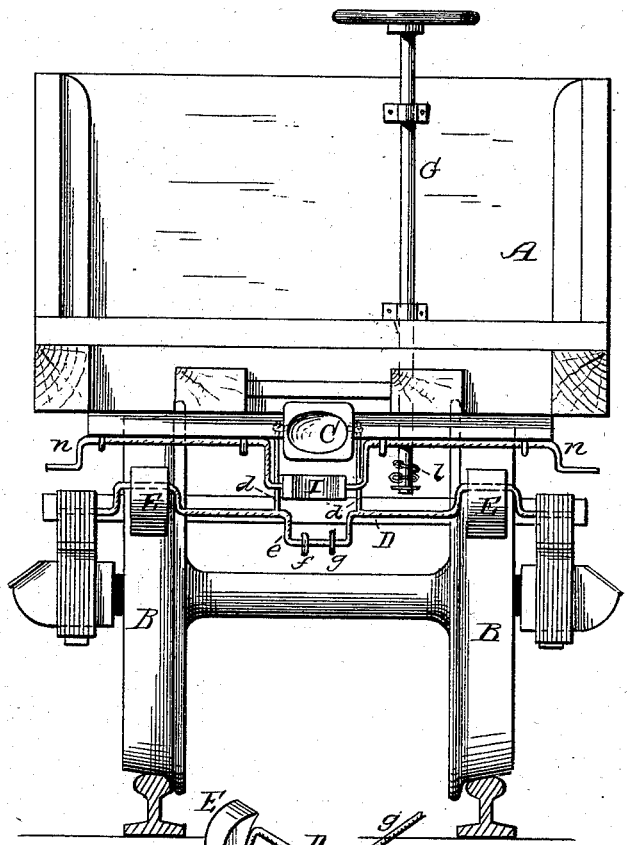
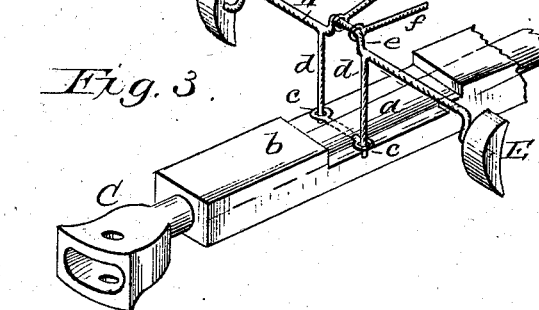

UNITED STATES PATENT OFFICE.

JOHN G. SCHILLER, OF YOUNGSTOWN, OHIO.

CAR-BRAKE.

SPECIFICATION forming part of Letters Patent No. 255,539, dated March 28, 1882.

Application filed February 14, 1882. (No model.)

*To all whom it may concern:*

Be it known that I, JOHN G. SCHILLER, a citizen of the United States, residing at Youngstown, in the county of Mahoning and State of Ohio, have invented certain new and useful Improvements in Car-Brakes; and I do hereby declare that the following is a full, clear, and exact description of the same, reference being had to the annexed drawings, making a part of this specification, and to the letters and figures of reference marked thereon.

Figure 1 of the drawings is an under plan view of a car truck with my invention applied. Fig. 2 is an end view thereof; and Fig. 3 is a perspective view, in detail, of the draw-head and brake attachment; Fig. 4, a detail view of the braces.

The present invention has relation to certain new and valuable improvements in car-brakes; and the object thereof is to connect the brake-shoes with the draw-head in such manner as to insure the operation of the brakes throughout the entire train of cars the moment the locomotive comes to a sudden stop, each car, as it comes in contact with the draw-head of the preceding car, operating the brakes, and thereby locking the cars all at one time and automatically, thus preventing the usual jar backward and forward of the train when brought to a sudden stop. These objects I attain by the construction substantially as shown in the drawings and hereinafter described.

In the accompanying drawings, A represents the body of a freight or other car mounted on the usual trucks, to which are connected the car-wheels B.

The draw-head C is of the usual construction, having the rear portion, $a$, in a boxing, $b$, upon the under side of the car body or bed. This draw-head C is adapted to slide back and forth in the ordinary manner, and the stem $a$ of the draw-head is provided with eyes $c$, projecting from its sides to receive the ends of arms $d$, extending up from a horizontal brake-rod, D, to the ends of which are secured the brake-shoes E. The rod D, at its center, is bent to form a crank, $e$, to which are connected the ends of rods $f\,g$, which extend the entire length of the car-truck to the brake-timber F.

To the timber F are secured eyebolts $h$, said bolts passing loosely through holes in the timber and having gage-nuts $i\,k$ to limit the distance between the two sets of brake-shoes, and also adapt the brakes to be applied to car-trucks of varying lengths.

A chain, $l$, is connected in any suitable manner to the timber F, one end of which is fastened to the truck-timber $m$, while the other end is connected to the usual brake-stem, G. The brake-shoes H of the timber F are brought against the wheels of the truck by the chain $l$, which draws the timber in a direction toward the wheels.

The manner of connecting the rods $f\,g$ to the timber F admits of the timber being moved without affecting the rods or the brake-shoes E. It will therefore be seen that the two sets of brake-shoes E and H may be operated independently of each other, and from any cause should the draw-head become broken the brake-shoes H could be used, also when any one of the cars stands alone. When the locomotive of the train of cars comes to a sudden stop the draw-head of one car will strike that of the car preceding it, and as the draw-head of said car is forced in by its connections with the brake-shoes E the latter will be brought against the wheels, and in like manner the entire train of cars is brought to a sudden stop without jarring back and forth.

In case the train of cars is backed, or where the brake-shoes E are not required for use, the same are held from contact with the wheels B by a yoke, I, of any suitable construction, which fits over the stem $a$ of the draw-head C. This yoke I is connected to a horizontal rod, $n$, for convenience of operating it to bring the yoke in position over the stem of the draw-head or release it therefrom.

It will be noticed that the brake-shoes act upon the upper portion of the wheels instead of the lower portion; or, in other words, the shoes are located on a line above the axis of the wheels, thereby securing a more direct power of the brake-shoe upon the wheel, as well as increased power and steadiness in action, thus forming a more perfect and secure lock for the wheels.

To the sides of the car-truck are secured angle-braces $p$ and braces $r$, bolted or otherwise connected to the extension-arms s, the braces r being so bent as to form guides for the ends of the timber F. These braces form a strong and rigid support for the ends of the timber F, to hold it in the required horizontal position.

Having now fully described my invention, what I claim as new, and desire to secure by Letters Patent, is—

1. The draw-head C and crank-rod D, having connected thereto the brake-shoes E, in combination with the timber F, brake-shoes H, and the rods $g f$, connected to said timber, substantially as and for the purpose specified.

2. The combination, with the timber F, carrying brake-shoes H, the chain l, and rods $f g$, of the draw-head C, crank-rod D, and the rod n, carrying yoke I, combined and arranged to operate substantially as and for the purpose specified.

3. The draw-head C, crank-rod D, carrying brake-shoes E, and the yoke I, in combination with the timber F, brake-shoes H, and rods $f g$, said rods being connected to said timber by eyebolts h and the gage-nuts $i k$, substantially as and for the purpose specified.

In testimony that I claim the above I have hereunto subscribed my name in the presence of two witnesses.

JOHN G. SCHILLER.

Witnesses:
 CHAS. J. WILLIAMSON,
 JOHN C. KILBY.